US009671789B1

United States Patent
Guo et al.

(10) Patent No.: US 9,671,789 B1
(45) Date of Patent: Jun. 6, 2017

(54) METHOD AND SYSTEM FOR ANTI-DISTURBANCE COMPOSITE ON-LINE GUIDANCE FOR ATMOSPHERE-ENTERING PHASE OF A MARS LANDER

(71) Applicant: Beihang University, Beijing (CN)

(72) Inventors: Lei Guo, Beijing (CN); Jianwei Xu, Beijing (CN); Jianzhong Qiao, Beijing (CN); Peixi Zhang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/371,506

(22) Filed: Dec. 7, 2016

(30) Foreign Application Priority Data

May 10, 2016 (CN) .......................... 2016 1 0306205

(51) Int. Cl.
    B64G 1/36 (2006.01)
    G05D 1/08 (2006.01)
    B64G 1/24 (2006.01)
(52) U.S. Cl.
    CPC ............ G05D 1/0883 (2013.01); B64G 1/24 (2013.01); B64G 2001/245 (2013.01)
(58) Field of Classification Search
    CPC ................................ G05D 1/0883; B64G 1/24
    USPC ................................................ 701/13; 706/52
    See application file for complete search history.

(56) References Cited

U.S. PATENT DOCUMENTS

| 2005/0246073 A1* | 11/2005 | Needelman | B64G 1/361 701/13 |
| 2008/0023587 A1* | 1/2008 | Head | B64G 1/10 244/158.4 |
| 2014/0074767 A1* | 3/2014 | Horwood | B64G 3/00 706/52 |

* cited by examiner

Primary Examiner — Thomas G Black
Assistant Examiner — Luke Huynh
(74) Attorney, Agent, or Firm — Locke Lord LLP; Tim Tingkang Xia, Esq.

(57) ABSTRACT

A method and system for anti-interference compound on-line guidance in the atmosphere-entering stage of a Mars lander is provided in the present invention. The method comprises steps of a) building a dynamics model for the atmosphere-entering phase of a Mars lander to incorporating the disturbance brought by the Mars atmosphere density uncertainty into the dynamics model for the atmosphere-entering stage of the Mars lander; b) constructing a disturbance observer to estimate the disturbance brought by the Mars atmosphere density uncertainty in the dynamics model for the atmosphere-entering phase of the Mars lander; c) building a prediction-correction guidance law, and guiding the heeling angle amplitude of the prediction-correction guidance law by continuously updating undetermined parameters; d) constructing an anti-disturbance composite guidance law to compensate the Mars atmosphere density uncertainty; and e) adjusting the deviation of the landing point of the Mars lander by compensating the Mars atmosphere uncertainty disturbance.

13 Claims, 2 Drawing Sheets

METHOD AND SYSTEM FOR ANTI-DISTURBANCE COMPOSITE ON-LINE GUIDANCE FOR ATMOSPHERE-ENTERING PHASE OF A MARS LANDER

CROSS-REFERENCE TO RELATED APPLICATIONS

This non-provisional application claims priority to and benefit of, under 35 U.S.C. §119(a), Patent Application No. 201610306205.1 filed in P.R. China on May 10, 2016, the entire content of which is hereby incorporated by reference.

FIELD OF THE INVENTION

The present invention relates to the field of aerospace technology, and in particular, to a method and system for anti-disturbance composite on-line guidance in the atmosphere-entering phase of a Mars lander.

BACKGROUND OF THE INVENTION

Recently, with the rapid development of space technology, deep space exploration has become a space activity which people all over the word are striving to implement. During the process of deep space exploration, the main task of people is to seek for life. As a fixed star that is the closed to the earth and has the possibility of signs of life, Mars also becomes the first station of people's journey for exploring the deep space. In view of the tasks that have been performed by people on Mars, the demand for landing precision will become higher and higher in the future Mars exploration. However, in consideration of the distance from Mars to the earth and all the unpredictable uncertainty factors on Mars, improvement of Mars landing precision faces with a huge challenge. An in-flight guidance system in a Mars lander may perform guidance law calculation, and thus plays an important role in adjusting the guidance precision of the lander. Except the Curiosity Explorer, all current Mars landing tasks adopt a guidance-free mode, and therefore landing precision cannot be ensured. The guidance method used by the Curiosity Explorer is a tack guidance method based on reference ground track, and is very weak in adaptability. In the case that Mars atmosphere density is highly indeterminate, the lander entering point has a deviation and the navigation measurement precision can hardly be ensured, it is difficult to improve the landing precision of the lander. A traditional prediction-correction guidance method can realize on-line generation of a guidance law, and thus can efficiently improve the adaptability of the lander. However, the prediction-correction guidance method has an extremely high requirement for the model precision of the lander, and the harsh environment of Mars has a significant impact on the precision of the guidance method. Related research has been conducted on the guidance method in the Mars atmosphere-entering phase in China. A method for precise control in a lander-entering phase based on feedforward compensation was provided in patent No. 201510303486.0. But there is a problem: in the current Mars landing task plan, the demand for surround-land-patrol integration requires the lander to implement on-line guidance law design and arrive the predetermined parachute-opening point without depending on the reference ground track, thereby ensuring the landing precision, and this method is relatively weak in autonomy.

Accordingly, there is a need for a method for anti-disturbance composite on-line guidance in the atmosphere-entering phase of a Mars lander that is able to efficiently implement on-line guidance, estimate and compensate Mars atmosphere uncertainty disturbances.

SUMMARY OF THE INVENTION

An objective of the present invention is to provide a method for anti-interference compound on-line guidance in the atmosphere-entering stage of a Mars lander, comprising the following steps of: a) building a dynamics model for the atmosphere-entering phase of a Mars lander to incorporating the disturbance brought by the Mars atmosphere density uncertainty into the dynamics model for the atmosphere-entering stage of the Mars lander; wherein, the dynamics model for the atmosphere-entering stage of the Mars lander is expressed as:

$$\begin{cases} \dot{s} = -\dfrac{V\cos\gamma}{r} \\ \dot{r} = V\sin\gamma \\ \dot{V} = -D - \left(\dfrac{\sin\gamma}{r^2}\right) + d_1 \\ \dot{\gamma} = \dfrac{1}{V}\left[L\cos\sigma + \left(V^2 - \dfrac{1}{r}\right)\left(\dfrac{\cos\gamma}{r}\right)\right] + d \\ E = \dfrac{1}{r} - \dfrac{V^2}{2} \end{cases}$$

in which, d and $d_1$ are atmosphere density uncertainty interferences, s is a length of a major arc from a position of the lander to a landing point, r is a distance from the center of Mars to the lander, V is a velocity of the lander relative to Mars, $\gamma$ is a flight-path angle of the lander relative to Mars, $\sigma$ is a controlled variable heeling angle and E is a monotonically increasing variable; a drag acceleration D is expressed as:

$$D = \dfrac{1}{2}\rho V^2 \dfrac{S}{m} C_D,$$

in which $C_D$ is a drag coefficient, a lift acceleration L is expressed as:

$$L = \dfrac{1}{2}\rho V^2 \dfrac{S}{m} C_L,$$

in which $C_L$ is a lift coefficient, and in the expressions of the drag acceleration D and lift acceleration L, S is a reference surface area of the Mars lander, m is a mass of the Mars lander, and $\rho$ is a Mars atmosphere density;

the Mars atmosphere density is specifically expressed as: $\rho = \rho_r \exp(-(\beta + \Delta\beta)(r - r_s))$, in which $\rho_s$ is the Mars atmosphere density with a reference radius of $r_s$, $\beta$ is an inverse function of a height of the Mars lander, and $\Delta\beta$ is uncertainty of atmosphere density;

b) constructing a disturbance observer to estimate the disturbance brought by the Mars atmosphere density uncertainty in the dynamics model for the atmosphere-entering phase of the Mars lander;

c) building a prediction-correction guidance law, and guiding the heeling angle amplitude of the prediction-correction guidance law by continuously updating undetermined parameters;

d) constructing an anti-disturbance composite guidance law to compensate the Mars atmosphere density uncertainty; and e) adjusting the deviation of the landing point of the Mars lander by compensating the Mars atmosphere uncertainty disturbance through the anti-disturbance composite guidance law.

Preferably, the interference observer in step b is expressed as:

$$\begin{cases} \dot{z} = -Q\left(\frac{L}{V}\cos\sigma + \left(V^2 - \frac{1}{2}\right)\frac{\cos\gamma}{rV}\right) - Q(z + Q\gamma) \\ \hat{d} = z + Q\lambda \end{cases}$$

in which, z is an auxiliary state variable, Q is a diagnotor gain matrix, and $\hat{d}$ is an estimated value of the Mars atmosphere density uncertainty interference d.

Preferably, the heeling angle amplitude of the prediction-correction guidance law is:

$$|\sigma(E)| = \sigma_0 + \frac{E - E_0}{E_f - E_0}(\sigma_f - \sigma_0),$$

in which, $\sigma_0 \geq 0$ is the undetermined parameter, $\sigma_f > 0$ is a constant, and E, $E_0$ and $E_f$ are energies at the current moment, at the initial moment and at the parachute-opening moment respectively.

Preferably, the undetermined parameter is updated by the following formula:

$$\sigma_0^{(k+1)} = \sigma_0^{(k)} - \lambda_k \frac{z(\sigma_0^{(k)})}{[z(\sigma_0^{(k)}) - z(\sigma_0^{(k-1)})]}(\sigma_0^{(k)} - \sigma_0^{(k-1)})$$

in which, $\lambda_k$ is a compensation parameter, whose value is taken according to $\frac{1}{2}^i$, with i being a natural number.

Preferably, the anti-interference compound guidance law is expressed as: $\tilde{u} = u - \hat{d}$, in which, $$u = \frac{L}{V}\cos\sigma,$$

with $\hat{d}$ being an estimated value of the Mars atmosphere density uncertainty interference d.

Another objective of the present invention is to provide a Mars lander system for anti-interference compound on-line guidance in the atmosphere-entering stage, comprising a Mars lander shell, a Mars lander atmosphere-entering phase dynamics module, an disturbance observer module, a prediction-correction guidance module, an anti-disturbance composite guidance module, a CPU, a Control Unit, at least one Mars lander legs and lander pads, wherein the Mars lander shell is supported by the Mars lander legs; the lander pad is connected to one end of the Mars lander legs to provide buffer to the Mars lander system when the Mars lander system is landed; the Mars lander atmosphere-entering phase dynamics module is configured to build a dynamics model for the atmosphere-entering phase of a Mars lander to incorporating the disturbance brought by the Mars atmosphere density uncertainty into the dynamics model for the atmosphere-entering stage of the Mars lander; the disturbance observer module is configured to constructing a disturbance observer to estimate the disturbance brought by the Mars atmosphere density uncertainty in the dynamics model for the atmosphere-entering phase of the Mars lander; the prediction-correction guidance module is configured to build a prediction-correction guidance law, and guiding the heeling angle amplitude of the prediction-correction guidance law by continuously updating undetermined parameters; the anti-disturbance composite guidance module is configured to constructing an anti-disturbance composite guidance law to compensate the Mars atmosphere density uncertainty; the CPU reads the data from the anti-disturbance composite guidance module and processes the data; and the control unit is configured to adjusting the deviation of the landing point of the Mars lander by compensating the Mars atmosphere uncertainty disturbance computed by the anti-disturbance composite guidance module, so as to control the landing attitude of the Mars lander system.

Preferably, the dynamics model for the atmosphere-entering stage of the Mars lander is expressed as:

$$\begin{cases} \dot{s} = -\frac{V\cos\gamma}{r} \\ \dot{r} = V\sin\gamma \\ \dot{V} = -D - \left(\frac{\sin\gamma}{r^2}\right) + d_1 \\ \dot{\gamma} = \frac{1}{V}\left[L\cos\sigma + \left(V^2 - \frac{1}{r}\right)\left(\frac{\cos\gamma}{r}\right)\right] + d \\ E = \frac{1}{r} - \frac{V^2}{2} \end{cases}$$

in which, d and $d_1$ are atmosphere density uncertainty interferences, s is a length of a major arc from a position of the lander to a landing point, r is a distance from the center of Mars to the lander, V is a velocity of the lander relative to Mars, $\gamma$ is a flight-path angle of the lander relative to Mars, $\sigma$ is a controlled variable heeling angle and E is a monotonically increasing variable; a drag acceleration D is expressed as:

$$D = \frac{1}{2}\rho V^2 \frac{S}{m} C_D,$$

in which $C_D$ is a drag coefficient, a lift acceleration L is expressed as:

$$L = \frac{1}{2}\rho V^2 \frac{S}{m} C_L,$$

in which $C_L$ is a lift coefficient, and in the expressions of the drag acceleration D and lift acceleration L, S is a reference surface area of the Mars lander, m is a mass of the Mars lander, and $\rho$ is a Mars atmosphere density;

the Mars atmosphere density is specifically expressed as: $\rho = \rho_r \exp(-\beta + \Delta\beta)(r - r_s))$, in which $\rho_s$ is the Mars atmosphere density with a reference radius of $r_s$, $\beta$ is an inverse function of a height of the Mars lander, and $\Delta\beta$ is uncertainty of atmosphere density.

Preferably, the interference observer in step b is expressed as:

$$\begin{cases} \dot{z} = -Q\left(\dfrac{L}{V}\cos\sigma + \left(V^2 - \dfrac{1}{2}\right)\dfrac{\cos\gamma}{rV}\right) - Q(z + Q\gamma) \\ \hat{d} = z + Q\lambda \end{cases}$$

in which, z is an auxiliary state variable, Q is a diagnotor gain matrix, and d̂ is an estimated value of the Mars atmosphere density uncertainty interference d.

Preferably, the heeling angle amplitude of the prediction-correction guidance law $$|\sigma(E)| = \sigma_0 + \frac{E - E_0}{E_f - E_0}(\sigma_f - \sigma_0),$$

in which, $\sigma_0 \geq 0$ is the undetermined parameter, $\sigma_f > 0$ is a constant, and E, $E_0$ and $E_f$ are energies at the current moment, at the initial moment and at the parachute-opening moment respectively.

Preferably, the undetermined parameter is updated by the following formula:

$$\sigma_0^{(k+1)} = \sigma_0^{(k)} - \lambda_k \frac{z(\sigma_0^{(k)})}{[z(\sigma_0^{(k)}) - z(\sigma_0^{(k-1)})]}(\sigma_0^{(k)} - \sigma_0^{(k-1)})$$

in which, $\lambda_k$ is a compensation parameter, whose value is taken according to $\frac{1}{2}^i$, with i being a natural number.

Preferably, the anti-interference compound guidance law is expressed as:

ũ=u−d̂, in which, $$u = \frac{L}{V}\cos\sigma,$$

with d̂ being an estimated value of the Mars atmosphere density uncertainty interference d.

In certain aspects, the present invention relates to a spacecraft having the Mars lander system as described above. In certain aspects, the present invention relates to a spacecraft using the method as described above.

It should be noted that the previous general description and the following specific description are both for illustration and explanation, and are not intended to limit the protection scope of the present invention.

BRIEF DESCRIPTION OF THE DRAWINGS

Further objectives, effects, and advantages of the present invention will become apparent from the following description of the embodiments of the present invention with reference to the accompanying drawings, wherein.

DETAILED DESCRIPTION OF THE INVENTION

Figure 1:
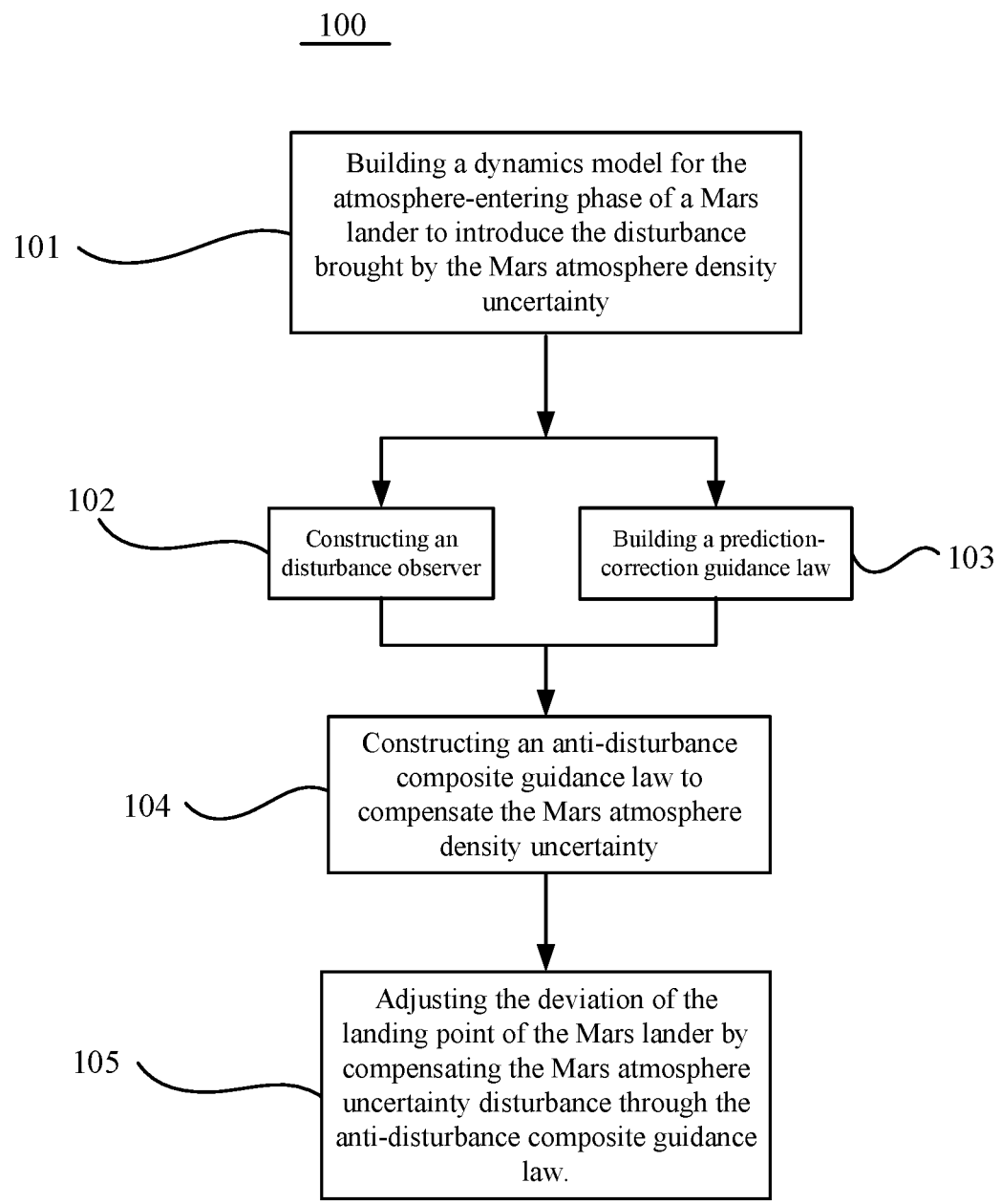
FIG. 1 illustrates a flowchart of a method for anti-disturbance composite on-line guidance in the atmosphere-entering phase of a Mars lander according to the present invention.

Objects and functions of the present invention as well as methods for realizing these objects and functions will be elucidated with reference to exemplary embodiments. However, the present invention is not limited to the following disclosed exemplary embodiments, but may be implemented in different ways. The description of the invention is merely provided to assist those of ordinary skill in the art in a comprehensive understanding of specific details of the invention in nature.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

Hereinafter, embodiments of the present invention will be described with reference to the drawings. In the drawings, like reference numerals designate like or similar parts or steps.

The present invention provides a method and system for anti-disturbance composite on-line guidance in the atmosphere-entering phase of a Mars lander. As shown in FIG. 1, it is a flowchart of the method for anti-disturbance composite on-line guidance in the atmosphere-entering phase of a Mars lander according to the present invention. In the guidance method 100 in this example, the influence of the Mars atmosphere uncertainty is incorporated into a dynamics model for the atmosphere-entering phase of a Mars lander, the value of the atmosphere uncertainty disturbance in the model is estimated and is composited with a prediction-correction guidance law to obtain an anti-disturbance guidance law. The anti-disturbance guidance law compensates for the Mars atmosphere uncertainty disturbance with the estimated value of the Mars atmosphere uncertainty disturbance. The method for anti-disturbance composite on-line guidance in the atmosphere-entering phase of a Mars lander according to the present invention will be described in details in the following.

Figure 2:
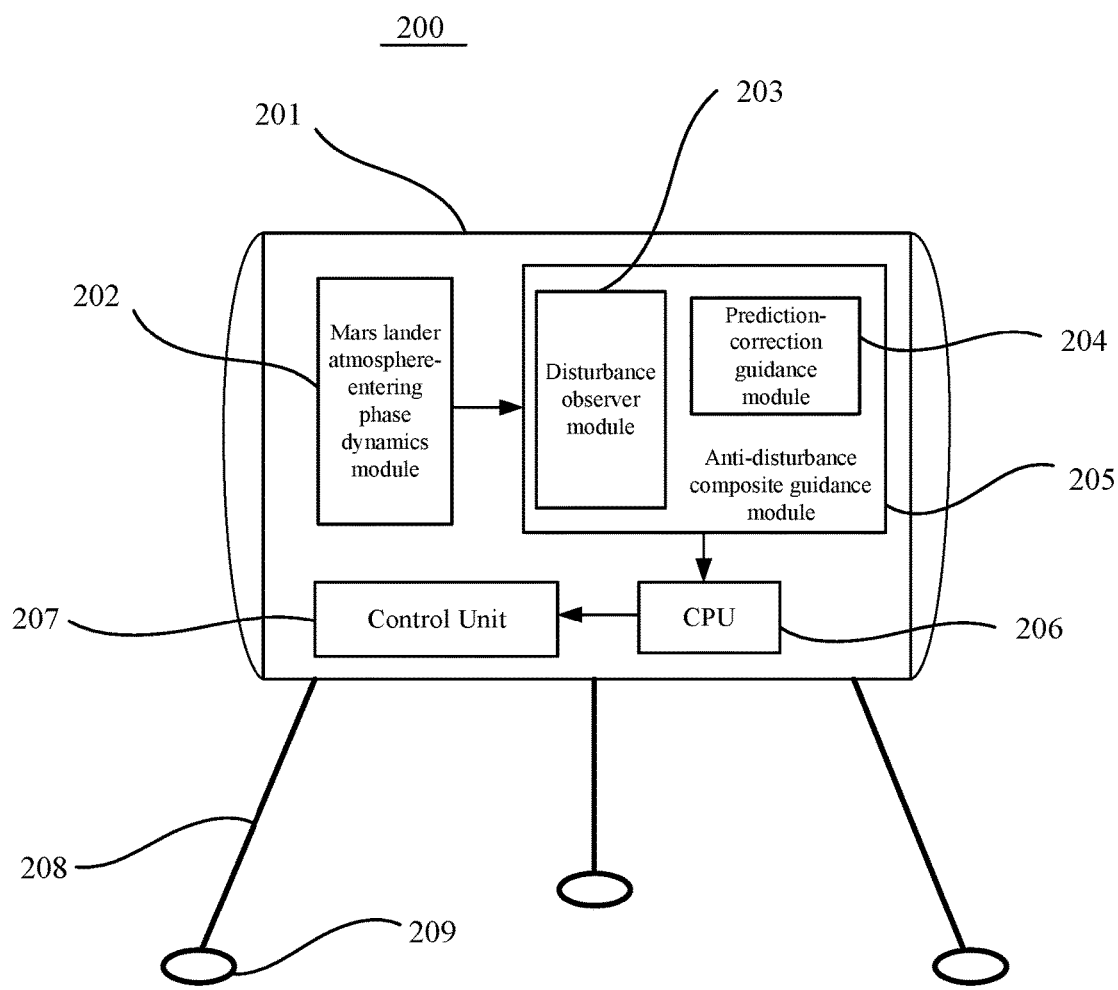
FIG. 2 shows a block diagram of the modules of the Mars lander according to an example of the present invention.

For the purpose of illustration, the method for anti-disturbance composite on-line guidance in the atmosphere-entering phase of a Mars lander provided in the present invention can be implemented by a system with functional modules. FIG. 2 is a block diagram of a Mars lander system according to an example of the present invention. Specifically, the Mars lander system 200 according to the present invention comprises a Mars lander shell 201, a Mars lander atmosphere-entering phase dynamics module 202, an disturbance observer module 203, a prediction-correction guidance module 204, an anti-disturbance composite guidance module 205, a CPU 206, a Control Unit 207, Mars lander legs 208 and lander pads 209.

As shown in FIG. 2, the Mars lander atmosphere-entering phase dynamics module 202, the disturbance observer module 203, the prediction-correction guidance module 204, the anti-disturbance composite guidance module 205, the CPU 206, and the Control Unit 207 are contained inside the Mars lander shell 201. The Mars lander shell 201 is supported by a plurality of Mars lander legs 208. A lander pad 209 is connected to one end of the Mars lander legs 208. When the Mars lander system 200 is landed, the lander pad 209 will contact the landing surface firstly so as to function as a buffer to the Mars lander system 200 to protect the elements inside the Mars lander system 200.

The Mars lander atmosphere-entering phase dynamics module 202 is configured to build a dynamics model for the atmosphere-entering phase of a Mars lander to incorporating the disturbance brought by the Mars atmosphere density uncertainty into the dynamics model for the atmosphere-entering stage of the Mars lander. The disturbance of Mars atmosphere density uncertainty to the Mars lander is incorporated into the Mars lander atmosphere-entering phase dynamics model.

The disturbance observer module 203 is configured to constructing a disturbance observer to estimate the disturbance brought by the Mars atmosphere density uncertainty in the dynamics model for the atmosphere-entering phase of the Mars lander. The disturbance observer module estimates the value of the Mars atmosphere density uncertainty disturbance in the Mars lander atmosphere-entering phase dynamics model.

The prediction-correction guidance module 204 is configured to build a prediction-correction guidance law, and guiding the heeling angle amplitude of the prediction-correction guidance law by continuously updating undetermined parameters. The prediction-correction guidance law guides the heeling angle amplitude in each step during the Mars landing process by updating the undetermined parameter of the heeling angle amplitude.

The anti-disturbance composite guidance module 205 is configured to constructing an anti-disturbance composite guidance law to compensate the Mars atmosphere density uncertainty. The anti-disturbance composite guidance law is used to compensate for the Mars atmosphere uncertainty disturbance with the estimated value of the Mars atmosphere uncertainty disturbance.

The CPU 206 reads the data from the anti-disturbance composite guidance module 205 and processes the data so as to provide to other modules.

The control unit 207 executes the processing result from the CPU 206 to send instructions to control the landing attitude of the Mars lander system 200. Specifically, the control unit 207 is configured to adjusting the deviation of the landing point of the Mars lander by compensating the Mars atmosphere uncertainty disturbance computed by the anti-disturbance composite guidance module 205.

The method for anti-disturbance composite on-line guidance in the atmosphere-entering phase of a Mars lander will be described in detail below. The specific steps of the guidance method according to this example are as follows:

Step 101: Building a dynamics model for the atmosphere-entering phase of a Mars lander to incorporating the disturbance brought by the Mars atmosphere density uncertainty into the dynamics model for the atmosphere-entering stage of the Mars lander.

The Mars lander will be disturbance by the Mars atmosphere density uncertainty when entering the atmosphere of Mars. In this example, the Mars atmosphere density uncertainty disturbance is incorporated into a dynamics model for the atmosphere-entering phase of the Mars lander to build the dynamics model for the atmosphere-entering phase of the Mars lander under the influence of the Mars atmosphere density uncertainty. The specific expression is as below:

$$\begin{cases} \dot{s} = -\dfrac{V\cos\gamma}{r} \\ \dot{r} = V\sin\gamma \\ \dot{V} = -D - \left(\dfrac{\sin\gamma}{r^2}\right) + d_1 \\ \dot{\gamma} = \dfrac{1}{V}\left[L\cos\sigma + \left(V^2 - \dfrac{1}{r}\right)\left(\dfrac{\cos\gamma}{r}\right)\right] + d \\ E = \dfrac{1}{r} - \dfrac{V^2}{2} \end{cases} \quad (1)$$

in which, d and $d_1$ are atmosphere density uncertainty disturbances, s is a length of a major arc from a position of the lander to a landing point, the initial value being preferably 744 km and the terminal value being 37 km; r is a distance (standardized with the Mars radius of $R_0$) from the center of Mars to the lander.

In this example, the initial value of r is 125 km and the terminal value is 10 km; V is a velocity (standardized with $$\sqrt{g_0 R_0}\,)$$

of the lander relative to Mars, and in this example, the initial value of V is 5505 m/s, and the terminal value is 410 m/s; γ is a flight-path angle of the lander relative to Mars, and is preferably −14.15; σ is a controlled variable heeling angle, and E is a monotonically increasing variable.

The Mars atmosphere density is indicated by ρ, and then the Mars atmosphere density meets the following formula: $\rho = \rho_r \exp(-(\beta + \Delta\beta)(r - r_s))$, in which $\rho_s$ is a Mars atmosphere density with a reference radius of $r_s$, and preferably the reference radius is 3429 km, and $\rho_s$ is 0.00078 kg/m$^3$; β is an inverse function of a height of the Mars lander, and is preferably 0.00011/m; and Δβ is uncertainty of atmosphere density.

The drag acceleration D and lift acceleration L in the dynamics model for the atmosphere-entering phase of the Mars lander are described with reference to the Mars atmosphere density ρ:

the drag acceleration D is expressed as:

$$D = \frac{1}{2}\rho V^2 \frac{S}{m} C_D,$$

in which $C_D$ is a drag coefficient;

the lift acceleration L is expressed as:

$$L = \frac{1}{2}\rho V^2 \frac{S}{m} C_L,$$

in which $C_L$ is a lift coefficient;

in the above expressions of the drag acceleration D and lift acceleration L, S is a reference surface area of the Mars lander, m is a mass of the Mars lander, and ρ is a Mars atmosphere density.

Step 102: Constructing a disturbance observer to estimate the disturbance brought by the Mars atmosphere density uncertainty in the dynamics model for the atmosphere-entering phase of the Mars lander.

The disturbance observer is specifically expressed through the following formula:

$$\begin{cases} \dot{z} = -Q\left(\dfrac{L}{V}\cos\sigma + \left(V^2 - \dfrac{1}{r}\right)\dfrac{\cos\gamma}{rV}\right) - Q(z + Q\gamma) \\ \hat{d} = z + Q\lambda \end{cases} \quad (2)$$

in which, z is an auxiliary state variable, Q is a diagnotor gain matrix, and $\hat{d}$ is an estimated value of the Mars atmosphere density uncertainty disturbance d.

The disturbance observer estimates the value of the disturbance d of the Mars atmosphere density uncertainty with the aid of the lift acceleration L, the velocity V of the lander relative to Mars, the distance r from the center of Mars to the lander and the flight-path angle γ of the lander relative to Mars in the dynamics model for the atmosphere-entering phase of the Mars lander and meanwhile by incorporating auxiliary state variable z and the undetermined gain matrix Q.

Preferably, in this example, $\hat{d}$ is an estimated value of the Mars atmosphere density uncertainty disturbance d.

As for the constructed disturbance observer, the undetermined gain matrix Q may be calculated through a LMI toolbox in some examples; while in other examples, it may be calculated through a convex optimal algorithm. Specifically, calculation of the undetermined matrix Q allows the estimated value $\hat{d}$ of the Mars atmosphere uncertainty disturbance to be approximate to the Mars atmosphere uncertainty disturbance d, i.e., $\hat{d} \approx d$.

In the step 102 of this example, the disturbance observer is constructed with respect to the influence of the atmosphere density uncertainty disturbance d in the dynamics model for the Mars atmosphere-entering phase, and the value of the atmosphere density uncertainty disturbance in the dynamics model for the Mars atmosphere-entering phase is estimated by the constructed disturbance observer.

Step 103: Building a prediction-correction guidance law, and guiding the heeling angle amplitude of the prediction-correction guidance law by continuously updating undetermined parameters.

As for the prediction-correction guidance law, the heeling angle amplitude of the prediction-correction guidance law is specifically expressed as:

$$|\sigma(E)| = \sigma_0 + \dfrac{E - E_0}{E_f - E_0}(\sigma_f - \sigma_0), \quad (3)$$

in which, $\sigma_0 \geq 0$ is a parameter to be determined, and $\sigma_f > 0$ is a constant.

The heeling angle amplitude of the prediction-correction guidance law is expressed by the energy E at the current moment, the energy $E_0$ at the initial moment of the Mars lander and the $E_f$ at the parachute-opening moment of the Mars lander. In this example, the heeling angle amplitude $|\sigma(E)|$ of the prediction-correction guidance law is continuously updated through the undetermined parameter $\sigma_0$ for guidance. In particular, update of the undetermined parameter $\sigma_0$ will be described in detail below.

In the heeling angle amplitude $|\sigma(E)|$ of the prediction-correction guidance law, the undetermined parameter $\sigma_0$ is updated according to the following formula:

$$\sigma_0^{(k+1)} = \sigma_0^{(k)} - \lambda_k \dfrac{z(\sigma_0^{(k)})}{[z(\sigma_0^{(k)}) - z(\sigma_0^{(k-1)})]}\left(\sigma_0^{(k)} - \sigma_0^{(k-1)}\right) \quad (4)$$

in which, $\lambda_k$ is a compensation parameter, the value of which is $\frac{1}{2}^i$, and preferably, i is a natural number, i.e., 0, 1, 2, 3, . . . , in order to meet update convergence of the undetermined parameter $\sigma_0$.

In this example, the heeling angle amplitude $|\sigma(E)|$ of the prediction-correction guidance law in each step of the landing process of the Mars lander is guided through the updated iterations of the undetermined parameter $\sigma_0$ by the prediction-correction guidance law according to the formula (1), thereby ensuring on-line guidance of the Mars lander.

Step 104: Constructing an anti-disturbance composite guidance law to compensate the Mars atmosphere density uncertainty.

The disturbance observer constructed preciously in this example is composited with the prediction-correction guidance law to obtain an anti-disturbance composite guidance law, which is specifically expressed as: $\tilde{u} = u - \hat{d}$; wherein, the control input of the Mars lander is described using the lift acceleration L, the velocity V of the lander relative to Mars and the controlled variable heeling angle σ in dynamics model for the atmosphere-entering phase of the Mars lander. Specifically, $$\tilde{u} = \dfrac{L}{V}\cos\tilde{\sigma},$$

and $$u = \dfrac{L}{V}\cos\sigma,$$

in which $\hat{d}$ is an estimated value of the Mars atmosphere density uncertainty disturbance, and $\tilde{\sigma}$ is the heeling angle after the Mars atmosphere uncertainty disturbance is compensated.

Step 105: Adjusting the deviation of the landing point of the Mars lander by compensating the Mars atmosphere uncertainty disturbance through the anti-disturbance composite guidance law.

With the aid of the anti-disturbance composite guidance law constructed in step 104, the deviation of the landing point of the Mars lander is adjusted through updating the heeling angle amplitude $|\sigma(E)|$ of the prediction-correction guidance law during the landing process. In particular, in the meantime, the value of the Mars atmosphere density uncertainty disturbance d in the atmosphere-entering phase of the Mars lander is estimated by the disturbance observer in step 103 during the above-mentioned process in this example.

The constructed anti-disturbance guide law $\tilde{u}$ compensates for the Mars atmosphere density uncertainty disturbance d in the atmosphere-entering phase of the Mars lander with the estimated value $\hat{d}$ of the Mars atmosphere density uncertainty disturbance d, thereby realizing adjustment of the controlled heeling angle. In particular, the composite guidance law in this example $$\tilde{u} = \dfrac{L}{V}\cos\tilde{\sigma}$$

subtracts the estimated value $\hat{d}$ of the Mars atmosphere density uncertainty disturbance from the control input u to offset the disturbance of the Mars atmosphere density uncertainty on the Mars lander during the landing process, thereby adjusting the heeling angle σ. The adjusted heeling angle σ̃ realizes precise guidance for the Mars lander.

In this example, the anti-disturbance guide law compensates for the Mars atmosphere density uncertainty disturbance d with the estimated value d̂ of the Mars atmosphere density uncertainty disturbance. Moreover, on-line guidance for the landing during the atmosphere-entering phase of the Mars lander is achieved by updating the heeling angle amplitude of the lander, with a high implementation autonomy and good anti-disturbance performance, thus ensuring landing precision.

In certain aspects, the present invention relates to a spacecraft having the Mars lander system as described above. In certain aspects, the present invention relates to a spacecraft using the method as described above.

Other examples of the present invention are obvious and easy to conceive for a person skilled in the art by combining the description disclosed herein and practice. The description and examples are only for illustration, and the real scope and essence of the present invention will be defined by the claims.

Based on the description and practice of the present invention as disclosed herein, other embodiments of the present invention are readily conceived of and understood to those skilled in the art. The description and embodiments are provided for exemplary purpose only, the real scope and spirit of the present invention are defined by the claims.

Other embodiments will be conceivable and understood by those skilled in the art upon consideration of this description or from practice of the invention disclosed herein. The description and embodiments are merely exemplary, and the true scope and spirit are intended to be defined by the claims.

What is claimed is:

1. A method for anti-interference compound on-line guidance in the atmosphere-entering stage of a Mars lander, comprising the following steps of:

a) building a dynamics model for the atmosphere-entering phase of a Mars lander to incorporating the disturbance brought by the Mars atmosphere density uncertainty into the dynamics model for the atmosphere-entering stage of the Mars lander, wherein, the dynamics model for the atmosphere-entering stage of the Mars lander is expressed as:

$$\dot{s} = -\frac{V\cos\gamma}{r}$$

$$\dot{r} = V\sin\gamma$$

$$\dot{V} = -D - \left(\frac{\sin\gamma}{r^2}\right) + d_1$$

$$\dot{\gamma} = \frac{1}{V}\left[L\cos\sigma + \left(V^2 - \frac{1}{r}\right)\left(\frac{\cos\gamma}{r}\right)\right] + d$$

$$E = \frac{1}{r} + \frac{V^2}{2}$$

in which, d and $d_1$ are atmosphere density uncertainty interferences, s is a length of a major arc from a position of the lander to a landing point, r is a distance from the center of Mars to the lander, V is a velocity of the lander relative to Mars, γ is a flight-path angle of the lander relative to Mars, σ' is a controlled variable heeling angle and E is a monotonically increasing variable; a drag acceleration D is expressed as:

$$D = \frac{1}{2}\rho V^2 \frac{S}{m} C_D$$

in which $C_D$ is a drag coefficient, a lift acceleration L is expressed as:

$$L = \frac{1}{2}\rho V^2 \frac{S}{m} C_L,$$

in which $C_L$ is a lift coefficient, and in the expressions of the drag acceleration D and lift acceleration L, S is a reference surface area of the Mars lander, m is a mass of the Mars lander, and ρ is a Mars atmosphere density;

the Mars atmosphere density is specifically expressed as: $\rho=\rho_s\exp(-(\beta+\Delta\beta)(r-r_s))$ in which $\rho_s$ is the Mars atmosphere density with a reference radius of $r_s$, β is an inverse function of a height of the Mars lander, and Δβ is uncertainty of atmosphere density;

b) constructing a disturbance observer to estimate the disturbance brought by the Mars atmosphere density uncertainty in the dynamics model for the atmosphere-entering phase of the Mars lander;

c) building a prediction-correction guidance law, and guiding the heeling angle amplitude of the prediction-correction guidance law by continuously updating undetermined parameters;

d) constructing an anti-disturbance composite guidance law to compensate the Mars atmosphere density uncertainty; and e) adjusting the deviation of the landing point of the Mars lander by compensating the Mars atmosphere uncertainty disturbance through the anti-disturbance composite guidance law so as to control the landing attitude of the Mars lander system.

2. The guidance method according to claim 1, wherein, the interference observer in step b is expressed as:

$$\begin{cases} \dot{z} = -Q\left(\frac{L}{V}\cos\sigma + \left(V^2 - \frac{1}{r}\right)\frac{\cos\gamma}{rV}\right) - Q(z + Q\gamma) \\ \hat{d} = z + Q\lambda \end{cases}$$

in which, z is an auxiliary state variable, Q is a diagnotor gain matrix, and d̂ is an estimated value of the Mars atmosphere density uncertainty interference d.

3. The guidance method according to claim 1, wherein, the heeling angle amplitude of the prediction-correction guidance law is:

$$|\sigma(E)| = \sigma_0 + \frac{E - E_0}{E_f - E_0}(\sigma_f - \sigma_0),$$

in which, $\sigma_0 \geq 0$ is the undetermined parameter, $\sigma_f > 0$ is a constant, and E, $E_0$ and $E_f$ are energies at the current moment, at the initial moment and at the parachute-opening moment respectively.

4. The guidance method according to claim 1, wherein, the undetermined parameter is updated by the following formula:

$$\sigma_0^{(k+1)} = \sigma_0^{(k)} - \lambda_k \frac{z(\sigma_0^{(k)})}{[z(\sigma_0^{(k)}) - z(\sigma_0^{(k-1)})]} (\sigma_0^{(k)} - \sigma_0^{(k-1)})$$

in which, $\lambda_k$ is a compensation parameter, whose value is taken according to $\frac{1}{2^i}$, with i being a natural number.

5. The guidance method according to claim 1, wherein, the anti-interference compound guidance law is expressed as: $\tilde{u} = u - \hat{d}$, in which, $$u = \frac{L}{V} \cos \sigma,$$

with $\hat{d}$ being an estimated value of the Mars atmosphere density uncertainty interference d.

6. A Mars lander system for anti-interference compound on-line guidance in the atmosphere-entering stage, comprising a Mars lander shell, a Mars lander atmosphere-entering phase dynamics module, an disturbance observer module, a prediction-correction guidance module, an anti-disturbance composite guidance module, a CPU, a Control Unit, at least one Mars lander legs and lander pads, wherein, the Mars lander shell is supported by the Mars lander legs;
the lander pad is connected to one end of the Mars lander legs to provide buffer to the Mars lander system when the Mars lander system is landed;
the Mars lander atmosphere-entering phase dynamics module is configured to build a dynamics model for the atmosphere-entering phase of a Mars lander to incorporating the disturbance brought by the Mars atmosphere density uncertainty into the dynamics model for the atmosphere-entering stage of the Mars lander;
the disturbance observer module is configured to constructing a disturbance observer to estimate the disturbance brought by the Mars atmosphere density uncertainty in the dynamics model for the atmosphere-entering phase of the Mars lander;
the prediction-correction guidance module is configured to build a prediction-correction guidance law, and guiding the heeling angle amplitude of the prediction-correction guidance law by continuously updating undetermined parameters;
the anti-disturbance composite guidance module is configured to constructing an anti-disturbance composite guidance law to compensate the Mars atmosphere density uncertainty;
the CPU reads the data from the anti-disturbance composite guidance module and processes the data;
the control unit is configured to adjusting the deviation of the landing point of the Mars lander by compensating the Mars atmosphere uncertainty disturbance computed by the anti-disturbance composite guidance module, so as to control the landing attitude of the Mars lander system.

7. The Mars lander system according to claim 6, wherein the dynamics model for the atmosphere-entering stage of the Mars lander is expressed as:

$$\begin{cases} \dot{s} = -\frac{V \cos \gamma}{r} \\ \dot{r} = V \sin \gamma \\ \dot{V} = -D - \left(\frac{\sin \gamma}{r^2}\right) + d_1 \\ \dot{\gamma} = \frac{1}{V}\left[L \cos \sigma + \left(V^2 - \frac{1}{r}\right)\left(\frac{\cos \gamma}{r}\right)\right] + d \\ E = \frac{1}{r} - \frac{V^2}{2} \end{cases}$$

in which, d and $d_1$ are atmosphere density uncertainty interferences, s is a length of a major arc from a position of the lander to a landing point, r is a distance from the center of Mars to the lander, V is a velocity of the lander relative to Mars, $\gamma$ is a flight-path angle of the lander relative to Mars, $\sigma$ is a controlled variable heeling angle and E is a monotonically increasing variable; a drag acceleration D is expressed as:

$$D = \frac{1}{2} \rho V^2 \frac{S}{m} C_D,$$

in which $C_D$ is a drag coefficient, a lift acceleration L is expressed as:

$$L = \frac{1}{2} \rho V^2 \frac{S}{m} C_L,$$

in which $C_L$ is a lift coefficient, and in the expressions of the drag acceleration D and lift acceleration L, S is a reference surface area of the Mars lander, m is a mass of the Mars lander, and $\rho$ is a Mars atmosphere density;

the Mars atmosphere density is specifically expressed as: $\rho = \rho_s \exp(-(\beta + \Delta\beta)(r - r_s))$, in which $\rho_s$ is the Mars atmosphere density with a reference radius of $r_s$, $\beta$ is an inverse function of a height of the Mars lander, and $\Delta\beta$ is uncertainty of atmosphere density.

8. The Mars lander system according to claim 6, wherein the interference observer in step b is expressed as:

$$\begin{cases} \dot{z} = -Q\left(\frac{L}{V}\cos\sigma + \left(V^2 - \frac{1}{r}\right)\frac{\cos\gamma}{rV}\right) - Q(z + Q\gamma) \\ \hat{d} = z + Q\gamma \end{cases}$$

in which, z is an auxiliary state variable, Q is a diagnotor gain matrix, and $\hat{d}$ is an estimated value of the Mars atmosphere density uncertainty interference d.

9. The Mars lander system according to claim 6, wherein the heeling angle amplitude of the prediction-correction guidance law is:

$$|\sigma(E)| = \sigma_0 + \frac{E - E_0}{E_f - E_0}(\sigma_f - \sigma_0),$$

in which, $\sigma_0 \geq 0$ is the undetermined parameter, $\sigma_f > 0$ is a constant, and E, $E_0$ and $E_f$ are energies at the current moment, at the initial moment and at the parachute-opening moment respectively.

10. The Mars lander system according to claim 6, wherein the undetermined parameter is updated by the following formula:

$$\sigma_0^{(k+1)} = \sigma_0^{(k)} - \lambda_k \frac{z(\sigma_0^{(k)})}{[z(\sigma_0^{(k)}) - z(\sigma_0^{(k-1)})]} \left(\sigma_0^{(k)} - \sigma_0^{(k-1)}\right)$$

in which, $\lambda_k$ is a compensation parameter, whose value is taken according to $\frac{1}{2^i}$, with i being a natural number.

11. The Mars lander system according to claim 6, wherein the anti-interference compound guidance law is expressed as: $\tilde{u} = u - \hat{d}$, in which, $$u = \frac{L}{V} \cos\sigma,$$

with $\hat{d}$ being an estimated value of the Mars atmosphere density uncertainty interference d.

12. A spacecraft comprising the Mars lander system of claim 6.

13. A spacecraft using the method of claim 1.

* * * * *